Jan. 26, 1943.　　　　G. W. WALTON　　　　2,309,285
DRAWWORKS TRANSMISSION
Filed May 13, 1941

Inventor
George W. Walton
By Lyon & Lyon
Attorneys

Patented Jan. 26, 1943

2,309,285

UNITED STATES PATENT OFFICE 2,309,285

DRAW WORKS TRANSMISSION

George W. Walton, Beverly Hills, Calif.

Application May 13, 1941, Serial No. 393,229

5 Claims. (Cl. 74—218)

This invention relates to a transmission for a drawworks, and refers particularly to a transmission intended for use in connection with a well drilling rig.

It is the present practice to provide a speed transmission between the engine or source of power of a drilling rig and the various pieces of equipment of the well drilling rig in order that these may be operated at different speed ratios. The transmission usually embodies an input shaft, which is driven by the engine or source of power, and an output shaft, which is intended to be operated at various speed ratios with reference to the input shaft. The output shaft is provided with drive connections to the equipment which is to be operated. The drawworks of the drilling rig is usually provided with two connections to the output shaft of the transmission, which connections are usually made at the opposite ends of the transmission and designed to provide different speed ratios between the output shaft and drawworks. By these two drive connections between the transmission and drawworks there is available both a plurality of low and a plurality of high speeds for operation of the drawworks. The other equipment of the well drilling rig is usually connected with one end of the output shaft and, therefore, as ordinarily designed, there is only one set of speed ratios available for operating the equipment of the rig other than the drawworks.

It is a general object of the present invention to provide a transmission which incorporates a simple means by which the two drive connections between the output shaft of the transmission and drawworks may be brought to equal values, permitting the drawworks to be driven simultaneously by both drive connections. In the operation of a drilling rig, where it is necessary to operate a heavy load upon the drawworks, it frequently becomes desirable to reduce the torque on the drive connections between the drawworks and transmission. By including in the transmission means for conditioning both drive connections to provide equal speed ratios between the transmission and drawworks, it becomes possible through the use of both drive connections simultaneously to have the torque applied to such drive connections under such conditions of heavy load.

A further object of the present invention is to provide a transmission which will render available twice the number of speed ratios usually available for driving various equipment of a drilling rig, such as a rotary table, front drum, etc. In the transmission of the present invention, double the number of speed ratios are available at one end of the output shaft of the transmission.

A further object of the present invention is to provide such additional speed ratios by the provision of simple connections to the usual reversing shaft of the transmission, permitting connection of this normal reversing shaft as a forward drive speed ratio element of the transmission.

A further and important object of the present invention is to provide a transmission containing means permitting the shifting of a drive connection from the transmission to the rotary table of a drilling rig (or other equipment to be driven by the transmission) from one speed ratio to a different speed ratio without interrupting and while maintaining continuously the flow of power through the transmission to the rotary table or other equipment being driven by the transmission.

Various further objects and advantages of the drawworks transmission of the present invention will appear from the following description of a preferred form or example of a drawworks transmission embodying the present invention. For this purpose, I have described a preferred form or example of a drawworks transmission embodying the invention, the description being given in connection with the accompanying drawing, in which—

Figure 2:
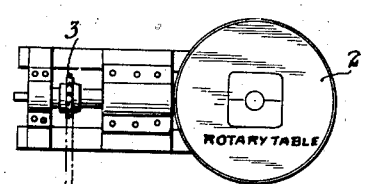
Figure 2 is a schematic view illustrating a combination including the present invention.
Figure 2:
Figure 3:
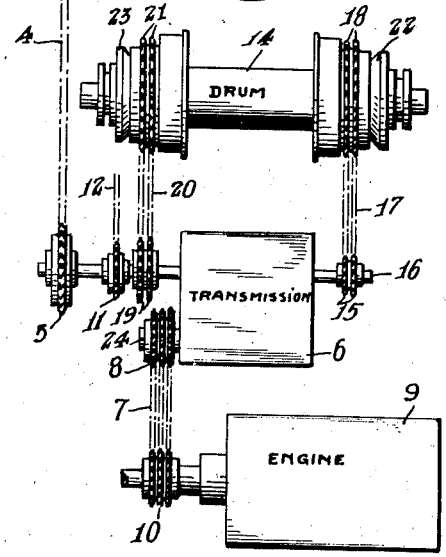
Figure 3 is a section through one of the sprockets.
Figure 3:
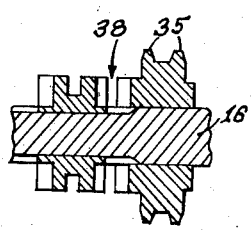

Figure 2 shows a general arrangement of a well drilling equipment in which 2 generally indicates any usual or preferred form of rotary table for a drilling rig, which is intended to be driven by a sprocket 3 from a chain drive 4 leading to a sprocket 5. 6 indicates the transmission of the present invention, which is indicated as driven by chains 7 and sprockets 8 from an engine 9 having sprockets 10. An additional drive sprocket 11 and chain 12 are indicated from the transmission 6, which may lead to any other desired equipment of a well drilling rig, such as a cathead (not shown) or a forward drum (not shown). The transmission 6 is indicated as provided with two drive connections at its opposite ends leading to the drawworks drum 14. A normally low speed drive is indicated, including sprockets 15 on the output shaft 16 of the transmission, together with chains 17 and sprockets 18 adapted to be connected to the drawworks drum 14. A normally relatively high speed drive connection is indicated, including sprockets 19 on the output shaft 16 of the transmission, chains 20 and sprockets 21 being adapted to be connected with the drum 14 of the drawworks. The drawworks 14 is indicated as provided with clutches 22, 23 preferably of the friction type and adapted to selectively or simultaneously connect either sprockets 18 or 21 to the drawworks drum 14.

Figure 1:
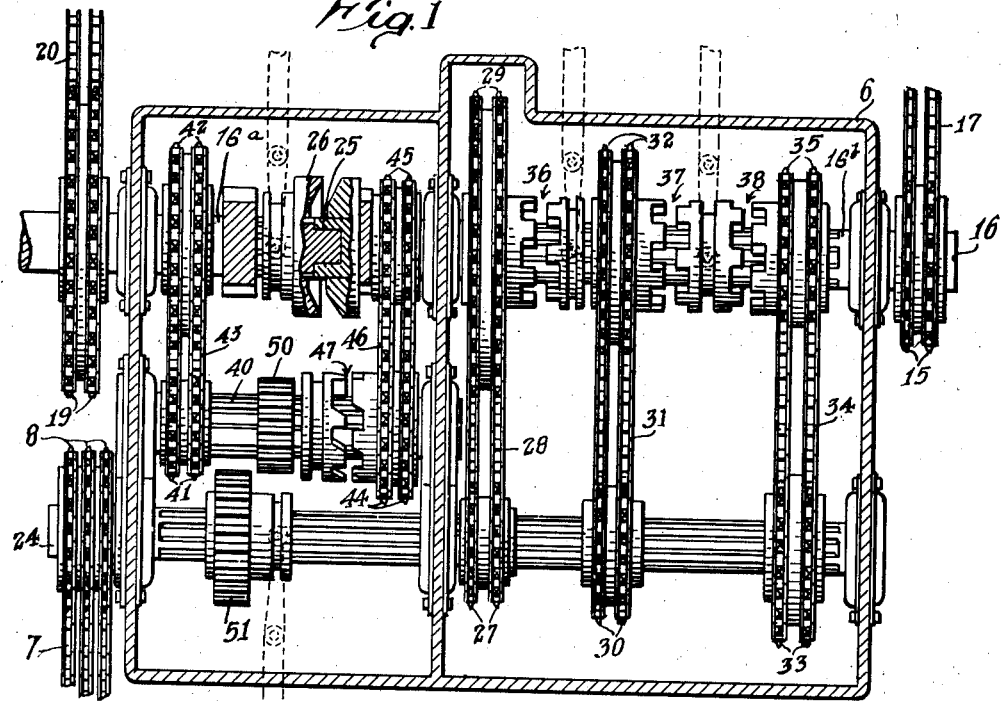
Figure 1 is a transverse sectional view through the transmission housing looking down on the shafts and gears, certain parts being in section.

Now referring more particularly to Figure 1 of the drawing, the transmission is indicated as provided with an input shaft 24, which carries the sprocket 8 associated with the drive from motor 9. It includes also the output shaft 16, which carries at one end the sprockets 15 of the low speed drive for the drawworks and at its other end the sprockets 5, 11 and 19. The shaft 16 is broken and provided with a pilot bearing, as indicated at 25, and with a clutch 26, preferably of the friction type, by means of which the two sections of the output shaft 16 of the transmission may be connected together or disconnected as the various operations render desirable. Between the input shaft 24 and the portion 16a of the output shaft 16 to the right of the pilot bearing 25, as viewed in Figure 1, there is provided any usual or preferred form of selective speed means. For example, I have indicated three different drive connections, a low speed drive connection including sprocket 27 on the input shaft 24, chains 28 and sprockets 29 on the output shaft 16, an intermediate drive connection including sprockets 30 on the input shaft 24, chains 31 and sprockets 32 on the output shaft 16, and a high speed drive connection including sprockets 33 on the input shaft chain 34 and sprockets 35 on the output shaft 16. Suitable clutching means for selectively clutching any of the desired drive connections are provided, for which purpose I have indicated the jaw clutches 36, 37 and 38. The jaw clutches 37 and 38 may, if desired, be a part of a double clutch.

By the particular selective speed mechanism connected between the input shaft 24 and output shaft 16 it will be observed that there are provided three separate speeds for driving the low speed drive connection leading to the drawworks. The portion 16b of the output shaft 16 to the left of the pilot bearing may also be driven at three different speeds by engagement of the friction clutch 26, which provides three high speed drive connections for the drawworks drum 14.

The transmission also includes an auxiliary shaft 40, which has a drive connection including sprocket 41 on the auxiliary shaft, sprocket 42 on the output shaft 16, and the chain drives 43. The drive connection between the auxiliary shaft 40 and the portion 16b of the output shaft 16 is a step down transmission, the sprocket 41 being sufficiently smaller than the sprocket 42 so as to bring the drive chains 20 and 17 leading to the drawworks to equal speeds when the auxiliary shaft 40 is driven from the portion 16a of the output shaft 16. The auxiliary shaft 40 is provided with a drive connection leading to the portion 16a of the output shaft 16 to the right of the pilot bearing, such drive connection including sprockets 44 on the auxiliary shaft, sprockets 45 on the output shaft 16, and drive chain 46. A clutch 47, preferably of the jaw type, is provided for connecting and disconnecting sprocket 44 in driving relation with the auxiliary shaft 40. By the use of the drive connections with the auxiliary shaft 40 and the clutches 47 and 26 it becomes possible to perform many additional useful operations with the transmission of the present invention. By disconnection of the two sections of the output shaft 16 through release of the friction clutch 26 and engagement of the clutch 47 it becomes now possible to drive the portion 16b of the output shaft 16 to the left of the pilot bearing at three additional low speeds. There is thereby available in the transmission of the present invention, in addition to the three normal driving speeds for driving such apparatus as the rotary table, front drum, or cathead, three new low speeds. It is also possible to bring the two drive connections leading to the drawworks to equal speeds, and when desired, therefore, both drive connections may be simultaneously employed for driving the drawworks drum 14, reducing the torque on either drive connection, which function of the transmission of the present invention is of great value when the drawworks drum is carrying a heavy load.

Through the particular construction of the transmission, it becomes possible also to shift the speeds at which the drawworks drum is driven without interrupting the flow of power to the drawworks drum. Thus, for example, where the drawworks drum is originally driven at a low speed, the drive connection being through the output shaft 16 to the auxiliary shaft 40 and thence to the portion 16b of the output shaft 16 to the left of the pilot bearing, friction clutch 26 being released and the clutch 47 being engaged, and it becomes desirable to increase the speed of the drawworks drum 14 while maintaining a flow of power thereto, this may be accomplished merely by engaging the friction clutch 26. When the friction clutch 26 is engaged, the portion 16b of the shaft 16 to the left of the pilot bearing accelerates in speed and the jaw clutch 47 will automatically kick out. It is to be understood that when it is desired to shift the speed of the drawworks drum without interrupting the flow of power to the drawworks drum one of the clutches on the drawworks drum is operated to disconnect the chain drive 17 previous to the engagement of friction clutch 26.

It is preferable to further include a gear 50 on the auxiliary shaft 40, which is adapted to engage with the sliding gear 51 on the input shaft 24 so that such auxiliary shaft 40 may also serve the function of a reversing shaft. It is understood, of course, that when a reverse drive is desired, gears 50 and 51 are engaged while clutches 26 and 47 are released.

While the transmission herein described is well adapted to carry out the objects of the present invention, it is to be understood, of course, that various modifications may be made, and the present invention is of the scope set forth in the appended claims.

I claim:

1. A drawworks transmission, comprising an input shaft, an output shaft, speed change mechanisms connecting said input and output shafts, said output shaft having two independently rotatable portions, clutch means for establishing a direct drive connection between said portions, an auxiliary shaft, a drive connection between one portion of said output shaft and said auxiliary shaft, and a drive connection between the other portion of said output shaft and said auxiliary shaft, said drive connection providing a speed change between the two portions of the output shaft when said portions are disconnected, a clutch in the drive connections between the portions of the output shaft and said auxiliary shaft, and reversing gear means selectively connectable between said input shaft and said auxiliary shaft.

2. A drawworks transmission, comprising an input shaft, an output shaft, speed change mechanism connecting the input and output shafts, the output shaft having two independently rotatable portions, a friction clutch for establishing a direct drive connection between said portions, an auxiliary shaft having drive connections with both portions of said output shaft, said drive connection including a jaw clutch, and selectively engageable reversing gearing for connecting the auxiliary and input shafts.

3. A transmission for driving the drawworks of a drilling rig, said transmission including an input shaft and an output shaft, said output shaft having two independently rotatable portions, clutch means for establishing a direct drive connection between said portions, a drive connection from each portion of said output shaft to said drawworks, said drive connections being adapted to provide different drive speeds when said clutch is engaged, an auxiliary shaft, drive connections between said auxiliary shaft and each portion of said output shaft and including a clutch, said drive connections being adapted to bring each of the drive connections between the output shaft and the drawworks to equally effective speeds, and a selectively engageable reversing gearing between the input and auxiliary shafts.

4. A transmission for driving the drawworks of a drilling rig, said transmission including an input shaft and an output shaft, said output shaft having two independently rotatable portions, clutch means for establishing a direct drive connection between said portions, a drive connection from each portion of said output shaft to said drawworks, said drive connections being adapted to provide different drive speeds when said clutch is engaged, an auxiliary shaft, drive connections between said auxiliary shaft and each portion of said output shaft and including a clutch, said drive connections being adapted to bring each of the drive connections between the output shaft and the drawworks to equally effective speeds, clutch means coupling the portions of the output shaft being of a friction type, and clutch means in the drive connections between the auxiliary shaft and portions of the output shaft being of a kick-out type whereby the speed ratio to the drawworks may be shifted without interruption of power flow.

5. A well drilling apparatus, comprising a combination with a drawworks having two drive connections selectively connectable with the drawworks by friction clutches, of a transmission for driving said drive connections, said transmission including speed change means for bringing both drive connections to conditions providing equal drive speed for said drawworks permitting simultaneous utilization of both drive connections, clutch means for establishing a higher speed ratio to said drawworks through one of said drive connections, and engageable while the drawworks is being driven through said speed change means for increasing the speed ratio to the drawworks without interruption of power flow thereto.

GEORGE W. WALTON.